US010661830B1

(12) United States Patent
Gunbatar (10) Patent No.: US 10,661,830 B1
(45) Date of Patent: May 26, 2020

(54) YAW ORIENTATION ERROR DETECTION (71) Applicant: Ag Leader Technology, Inc., Ames, IA (US)

(72) Inventor: Yakup Gunbatar, Ames, IA (US)

(73) Assignee: Ag Leader Technology, Inc., Ames, IA (US)

( * ) Notice: Subject to any disclaimer, the term of this patent is extended or adjusted under 35 U.S.C. 154(b) by 159 days.

(21) Appl. No.: 15/639,742

(22) Filed: Jun. 30, 2017

Related U.S. Application Data (60) Provisional application No. 62/358,265, filed on Jul. 5, 2016.

(51) Int. Cl.
 *B62D 6/00* (2006.01)
 *G01C 21/16* (2006.01)
 *A01B 69/04* (2006.01)
 *G05D 1/02* (2006.01)

(52) U.S. Cl.
 CPC ............ *B62D 6/003* (2013.01); *A01B 69/008* (2013.01); *G01C 21/165* (2013.01); *G05D 1/027* (2013.01); *G05D 1/0278* (2013.01); *G05D 2201/0201* (2013.01)

(58) Field of Classification Search
 USPC .......................................................... 701/41
 See application file for complete search history.

(56) References Cited

U.S. PATENT DOCUMENTS

| | | | |
|---|---|---|---|
| 7,225,060 B2 | 5/2007 | O'Connor et al. | |
| 9,217,643 B1 * | 12/2015 | Belenkii .................... | G01S 5/16 |
| 9,983,311 B2 * | 5/2018 | McPeek ............. | G01N 33/0098 |
| 10,151,839 B2 * | 12/2018 | McPeek ............. | G01N 33/0098 |
| 2009/0177398 A1 * | 7/2009 | Belenkii .............. | G01C 21/025 |
| | | | 701/500 |
| 2015/0226827 A1 * | 8/2015 | Aycock .................. | G01S 3/7861 |
| | | | 382/103 |
| 2017/0016870 A1 * | 1/2017 | McPeek ............. | G01N 33/0098 |
| 2017/0176595 A1 * | 6/2017 | McPeek ............. | G01N 33/0098 |
| 2018/0259496 A1 * | 9/2018 | McPeek ............. | G01N 33/0098 |

OTHER PUBLICATIONS

NovAtel Application Note 064, "IMU Errors and Their Effects" Rev. A (online at http://www.novatel.com/assets/Documents/Bulletins/APN064.pdf), 6 pages Feb. 21, 2014.

* cited by examiner

*Primary Examiner* — Tyler D Paige
(74) *Attorney, Agent, or Firm* — Goodhue, Coleman & Owens, P.C.

(57) ABSTRACT

Methods, apparatus, and systems for detecting and compensating for yaw orientation error or misalignment of an IMU in a vehicle navigation system. Acceleration measurements available from the IMU can be used for fast, reliable, and compact estimation of alignment error whether or not the IMU and fixed-body frames share an origin or not. The detection can be included in a navigation solution for guidance and control systems of a vehicle without having to utilize other measurements such as GPS.

21 Claims, 8 Drawing Sheets

YAW ORIENTATION ERROR DETECTION

I. BACKGROUND OF THE INVENTION

A. Field of the Invention

The present relates to navigation systems and, in particular, to compensating for yaw orientation of an inertial measurement unit (IMU) with respect to the vehicle in navigation systems that include inertial navigation components, which can be used with guidance and control system for steering vehicles.

B. Problems in the Art

Main sources of errors in inertial navigation systems (INSs) due inertial measurement unit (IMU) data are well-known. Error in INSs solution not only origins from internal IMU errors (See, e.g., http://www.novatel.com/assets/Documents/Bulletins/APN064.pdf) but also from (mis)alignment or orientation error of the IMU on the vehicle.

A typical INS set up includes an inertial measurement unit (IMU) component mounted on the vehicle. An INS uses sensor measurements of acceleration and rotation with information about position, velocity and attitude to continuously create updated information about the motion of the IMU, and accordingly the vehicle. To be able to use IMU data to infer the motion of the vehicle, orientation of the IMU unit with respect to the vehicle (the Body-fixed frame), must be known. The orientation is represented by three rotation angles, yaw, roll, and, pitch angles. These three angles yield the transformation matrix, used to transform the IMU data to the body-fixed frame. This invention provides a practical and simple method in finding yaw orientation of the IMU with respect Body-fixed frame. The output from the IMU can be aided by or combined with other sensors or components. Examples are INS filters (sometimes called Kalman filters) and GNSS systems.

IMU measurements are integrated with respect to time. Errors in the measurements therefore grow or accumulate over time. This is antagonistic with producing highly accurate navigation solutions. Inherent error in IMU measurement can cause significant problems in the navigation solution.

One example is bias error. IMU bias is the difference between the actual value and what the IMU outputs. This is not unique to IMU sensors. If not compensated (estimated), bias error can yield error in navigation solution. Also bias can change each power up of the IMU, or can change with the environment temperature. Or error in data can be because of scale factor. Its variability further complicates the issue. Some of these errors can be compensated through calibrations by manufacturers.

Some designers chose to ignore at least some IMU errors. Some are considered too small or negligible in magnitude to try to deal with. Some are simply ignored. Or some errors can be estimated in INS filters.

There is other complexity in understanding and dealing with IMU errors. In addition to the aforementioned errors and corresponding calibrations, error can be introduced due to mounting of the unit on the vehicle.

There can be an offset or misalignment between the IMU housing and the vehicle. Any such angular offset is called orientation error, consisting of yaw, pitch, and roll angle errors. The coordinate systems of the IMU (IMU frame) and that of the vehicle (Body-fixed frame) are therefore not aligned. It simply might be difficult to perfectly mount a housing to a vehicle. Mounting surfaces and hardware may not allow it. Human error can contribute. It can be further complicated if the mounting location is not right at the origin of the Body-fixed frame. As will be further discussed, some fixed-body frames use the center of the rear, non-steerable axle as the origin.

This is not an academic problem. Even what might be considered small yaw orientation errors can be significant. Again, reliance on the navigation solution can be critical to the work to which the navigation solution is being applied.

One example of use of a navigation system is to inform a guidance system for agriculture vehicle control. Automated vehicle steering accuracy, at least with GPS assisted INS navigation, can be in the sub-inch range. While this might appear to be sufficient, pressures for still improved accuracy exist. Condensed plant populations calls for seed planting accuracy. Efficient use of chemicals (e.g. fertilizer, herbicide, insecticide) demand the same. Inaccuracies can result in such things as missing application of fertilizer, pesticide, or insecticide, which can affect yield. On the other hand, unnecessary overlapping can be wasteful and sometimes affect yield. A subsequent pass through a field may be misaligned with the first pass, and thus be less effective or even damaging. These issues can have real and significant economic consequences.

Navigation solutions are essentially position, velocity, and velocity estimates of the vehicles. Combining techniques, as by compensating INS drift with GPS, still relies on INS computed estimations with periodical GPS absolute position data. Furthermore, there are a variety of factors that can affect INS and GPS, both internal and external. For example, INS accuracy tends to be a function of cost of its sensors. GPS accuracy can be affected by degraded or lost satellite signal, multipath interference, or atmospheric delay.

Other factors must be considered when designing such navigation systems and methods. Cost of components is one. Speed and accuracy come at a price. Also computing overhead can be a concern. There are competing interests for processing time and power, not only for navigation, but also guidance and control. Form factor and size is another. Some applications benefit from small form factor. Ruggedness is another. Many applications are outdoors in wildly varying environmental conditions.

Therefore, even though finding pitch and roll orientation error by using the accelerometer data is known and available, there is room for improvement. The designer has to balance factors such as discussed above. Some of the factors are antagonistic to one another.

One way to try to detect yaw orientation error is by optical boresighting techniques. This is difficult relative to mounting locations on vehicles. Also, it is just an estimation and then requires a re-attempt at perfect IMU mounting. It is also susceptible to human error. Speeding up on a smooth and straight path could be used to estimate yaw orientation; however, especially for farming and other off-road vehicles generally, a smooth, straight, and long-enough path is not available. Besides, sufficient speeding up to estimate the yaw orientation error could be unsafe.

Other attempts try to use GPS, velocity, turn radius, curvature, steering angle, or other data and estimate and compensate. But these techniques take time, computing power, and a variety of different measurements. Computing resource overhead to accomplish these techniques can be detrimental to overall navigation solution generation.

This method simply uses left and right pivot turns at a constant speed and steering angle. As pivot turns are generally used for some other calibrations, this method can be incorporated in to those pivot turns to save time.

II. SUMMARY OF THE INVENTION

A. Objects, Features, Aspects, and Advantages

A principle object, feature, aspect, or advantage of the present invention is a method, apparatus, and system which improves over or solves problems and deficiencies in the state of the art.

Other objects, features, aspects, or advantages of the invention include a method, apparatus, or system which:
a. does not use any GPS measurement and any complicated algorithm.
b. is reliable, fast and compact enough to be included in the navigation system calibration process.
c. can be done as a part of overall navigation and/or guidance set-up and calibration.
ed. uses existing sensors.
e. uses minimal computing resources.
f. can be effective across different IMU mounting positions, IMU acceleration biases, and vehicle uses.
g. is relatively economical and efficient.

B. Aspects of the Invention

This method is used to detect yaw orientation error, the angle between IMU x-axis and body-fixed frame x-axis, the nose of the vehicle. This angle needs to be found and included in misalignment matrix, transformation matrix from IMU frame to the Body-fixed frame. This method will detect the yaw misalignment and include into the misalignment matrix, which yields faster convergence and more stability in estimation. This method is simple and easy to use. It does not need to use GPS measurements. Even though yaw misalignment is supposed to be known, it can be wrong due to various reasons. Therefore, this method will compensate this issue.

In another aspect of the invention, the method takes acceleration measurements of the IMU during a constant velocity turn or turns to calibrate for yaw orientation error. When the IMU frame and the Body-fixed frame share an origin, and acceleration bias is known or negligible, just one turn, whether left or right, is sufficient. If bias is not known or is not considered negligible, and/or the IMU and fixed-body do not share an origin, measurements are taken during left and right turns. This estimation is added to the navigation solution. It uses data available from the IMU and it does not have to consult other sensors or components. It does not invoke complex algorithms. It is reliable, fast, and efficient.

In another aspect, an apparatus comprises an IMU having a programmable controller or processor that is programmed to detect yaw orientation error and make it available for the navigation solution.

In another aspect, a system comprises a navigation system with the yaw orientation compensation described above, in combination with a guidance system which uses the navigation solution to instruct a control system, such as automated vehicle steering.

III. BRIEF DESCRIPTION OF THE DRAWINGS

A. Figures

To assist in an understanding of the invention, various drawings and illustrations are included. Note that, in the Figures, GPS data and turn radiuses are provided and plotted only to visualize the results and followed paths. They are not used in the method.

IV. DETAILED DESCRIPTION OF EXEMPLARY EMBODIMENTS

A. Overview

For a better understanding of the invention summarized above, one or more specific examples will now be described in detail. It is to be understood that the examples are neither inclusive nor exclusive of all forms and embodiments the invention can take.

These examples will highlight application to agriculture vehicles with automated steering. However, the invention can be applied in analogous ways to other applications.

For example, the invention can be applied in the context of the following ways, which give details about this general technology and are incorporated by reference herein as background information:

NovAtel Application Note 064, "IMU Errors and Their Effects" Rev. A Feb. 21, 2014 (on-line at http://www.novatel.com/assets/Documents/Bulletins/APN064.pdf).

U.S. Pat. No. 7,225,060 to Novariant entitled "Vehicle Control System with User-Guided Calibration.

B. Embodiments

With reference to the Figures, a first exemplary embodiment of the invention is described below. It can be applied in any number of typical and commercially available IMUs or associated components via appropriate programming techniques, such as are within the skill of those skilled in this technical field.

The method according to this example of the invention can be a part of a combination of a navigation system, guidance system, and steering control system associated an agricultural vehicle. The navigation system would inform the guidance system which would instruct the control system to effectuate locomotion of the vehicle relative a predetermined path through a field.

The components of such navigation, guidance, and steering control systems are commercially available from a variety of sources. Examples are guidance and steering products from the owner of the present applications, Ag Leader Inc., Ames, Iowa 50010 USA, including brands SteerCommand® and OnTrac$_3$™. Details regarding how the systems interconnect and interact, as well as the ability to program digital processors associated with them, are also well known to those skilled in the art. U.S. Pat. No.

7,225,060, incorporated by reference herein, discusses automated tractor steering, including calibration.

The following examples describe how an IMU can be programmed to compensate for yaw orientation error. That compensated navigation solution can then be used by a steering guidance and control combination. The result can be improved accuracy in motion estimation which can be leveraged into improved accuracy in locomotion.

Yaw Orientation Error Detection

Nomenclature

| | |
|---|---|
| A | Center of the rear axle, |
| $a_r$ | Radial acceleration, |
| $a_t$ | Tangential acceleration, |
| $\alpha_e$ | Yaw error due to the placement of IMU (the angle between $x_b$ and $\vec{V}_I$) |
| $\delta$ | Steering angle, |
| $F_{xb,yb,zb}$ | Body-fixed frame, |
| $F_{xI,yI,zI}$ | IMU frame after roll and pitch misalignment transformation, |
| $F_{xyz}$ | IMU frame, |
| $\psi_e$ | Yaw error (the angle between $x_b$ and $x_I$) |
| $\vec{V}_A$ | Velocity vector of the point A, |
| $\vec{V}_I$ | Velocity vector of IMU, |
| $\vec{\omega}$ | Angular rate of the body-fixed frame, |

1 Method

As roll and pitch angle error detection (misalignment) methods, using accelerometer data, are already available and in use, here we assume that transformation due roll and pitch angle misalignment is already performed. This method is proposed to detect yaw orientation error, the angle between IMU x-axis $x_I$ and body-fixed frame x-axis $x_b$. See FIG. 1 where, IMU frame and body-fixed frame share the same origin, which is located at the center of rear axle. It is assumed that no side-slip angle exists at the rear axle. Note that $F_{xI,yI,zI}$ defines the reference IMU frame after roll and pitch misalignment. The original IMU frame is denoted by $F_{xb,yb,zb}$. The method is based on using minimum amount of data or measurement so that it can be performed with or just after wheel angle calibration.

Figure 1:
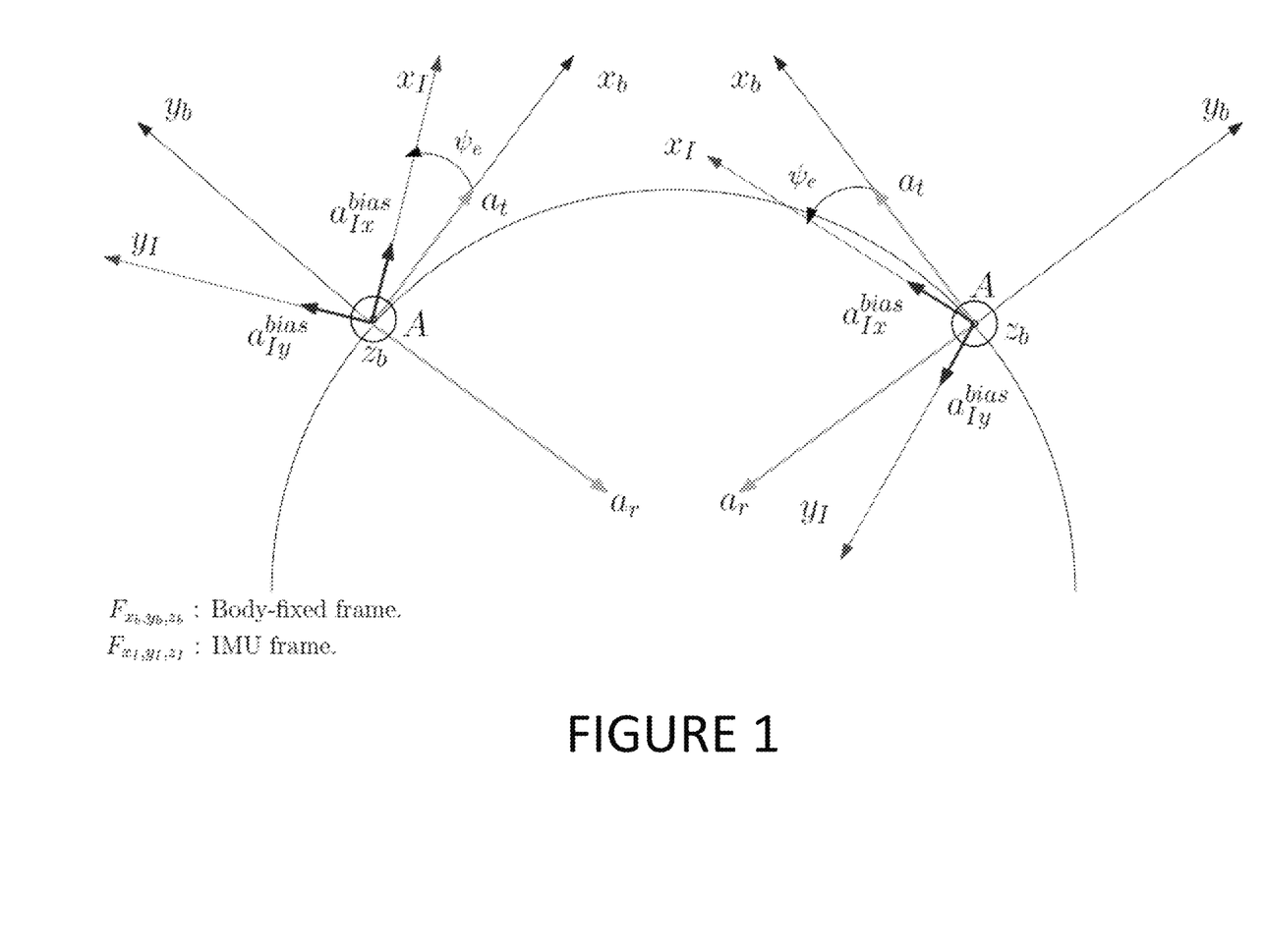
FIG. 1 is a diagram illustrating angle offset (yaw orientation error) between a body-fixed frame and an IMU frame during a left and right pivot turn.

The method is established on the fact that at a constant speed pivot turn, tangential acceleration is equal to zero. Radial acceleration, equal to square of speed divided by turn radius, $V^2/R$, could also be used. However, it requires the knowledge of velocity and turn radius, which can be obtained via GPS or from curvature, steering angle, and wheel base relation. When biases in accelerations are known or negligibly small, left or right turn at constant speed suffice to find the yaw error $\psi_e$. Nevertheless, when biases are not negligible or known, left and right complete pivot turns are needed. Complete turns are needed to cancel out the gravity contribution in case of non-flat terrain, i.e., rolling terrain. As seen in FIG. 1, radial acceleration contributes reversely to IMU acceleration measurements for right and left turns. Measured accelerations by IMU are written with respect to radial acceleration and biases for right and left turns as follows $$a_{Ix}^{right} = a_{Ix}^{bias} - a_r \sin \psi_e \ \& \ a_{Iy}^{right} = a_{Iy}^{bias} - a_r \cos \psi_e \quad (1.1)$$

$$a_{Ix}^{left} = a_{Ix}^{bias} - a_r \sin \psi_e \ \& \ a_{Iy}^{left} = a_{Iy}^{bias} - a_r \cos \psi_e \quad (1.2)$$

Lets remember that the method uses that fact that tangential acceleration at constant speed is equal zero:

$$a_t = 0 = a_{Ix} \cos \psi_e - a_{Iy} \sin \psi_e \quad (1.3)$$

Then, $\psi_e$ is obtained as follows $$\psi_e = \tan^{-1}\left(\frac{a_{Ix}}{a_{Iy}}\right) \quad (1.4)$$

When measured accelerations have non-zero biases, there will be error in calculation of $\psi_e$. To eliminate the biases in calculation we need to use data from left and right pivot turns. In addition, due to the fact that, in general, accelerations are noisy, we will use mean values of them. Mean accelerations, $\bar{a}_{Ix}$ & $\bar{a}_{Iy}$, for left and right pivot turns (to cancel out the biases) can be found as follow $$\bar{a}_{Ix} = \frac{a_{Ix}^{left} - a_{Ix}^{right}}{2} = a_r \sin \psi_e \quad (1.5)$$

$$\bar{a}_{Iy} = \frac{a_{Iy}^{left} - a_{Iy}^{right}}{2} = a_r \cos \psi_e \quad (1.6)$$

Then, yaw orientation error can be found:

$$\psi_e = \tan^{-1}\left(\frac{\bar{a}_{Ix}}{\bar{a}_{Iy}}\right) \quad (1.7)$$

Similarly, we can also find average biases:

$$a_{Ix}^{bias} = \frac{a_{Ix}^{left} + a_{Ix}^{right}}{2} \quad (1.8)$$

$$a_{Iy}^{bias} = \frac{a_{Iy}^{left} + a_{Iy}^{right}}{2} \quad (1.9)$$

If, due to any reason, left and right circle (pivot) steering angle or speed differs, radial acceleration for left $a_r^{left}$ and $a_r^{right}$ circle will be different. In this case, Eqs. 1.5 and 1.6 become $$\bar{a}_{Ix} = \frac{a_{Ix}^{left} - a_{Ix}^{right}}{2} = \left(\frac{a_r^{left} + a_r^{right}}{2}\right)\sin\psi_e \quad (1.10)$$

$$\bar{a}_{Iy} = \frac{a_{Iy}^{left} - a_{Iy}^{right}}{2} = \left(\frac{a_r^{left} + a_r^{right}}{2}\right)\cos\psi_e \quad (1.11)$$

As seen, biases are still canceled; therefore, yaw (orientation) error is still found via Eq. 1.7. Since, addition of right and left turn radial accelerations will be canceled out as well when Eq. 1.10 is divided by Eq. 1.11 to get Eq. 1.7. However, in this case, biases can not directly be found via Eqs. 1.8 and 1.9. On the other side, the knowledge of left or right pivot turn radial acceleration, which corresponds to knowing speed and turn radius, with obtained yaw orientation error can still provide us with average biases through Eqs. 1.1 and 1.2.

Figure 2:
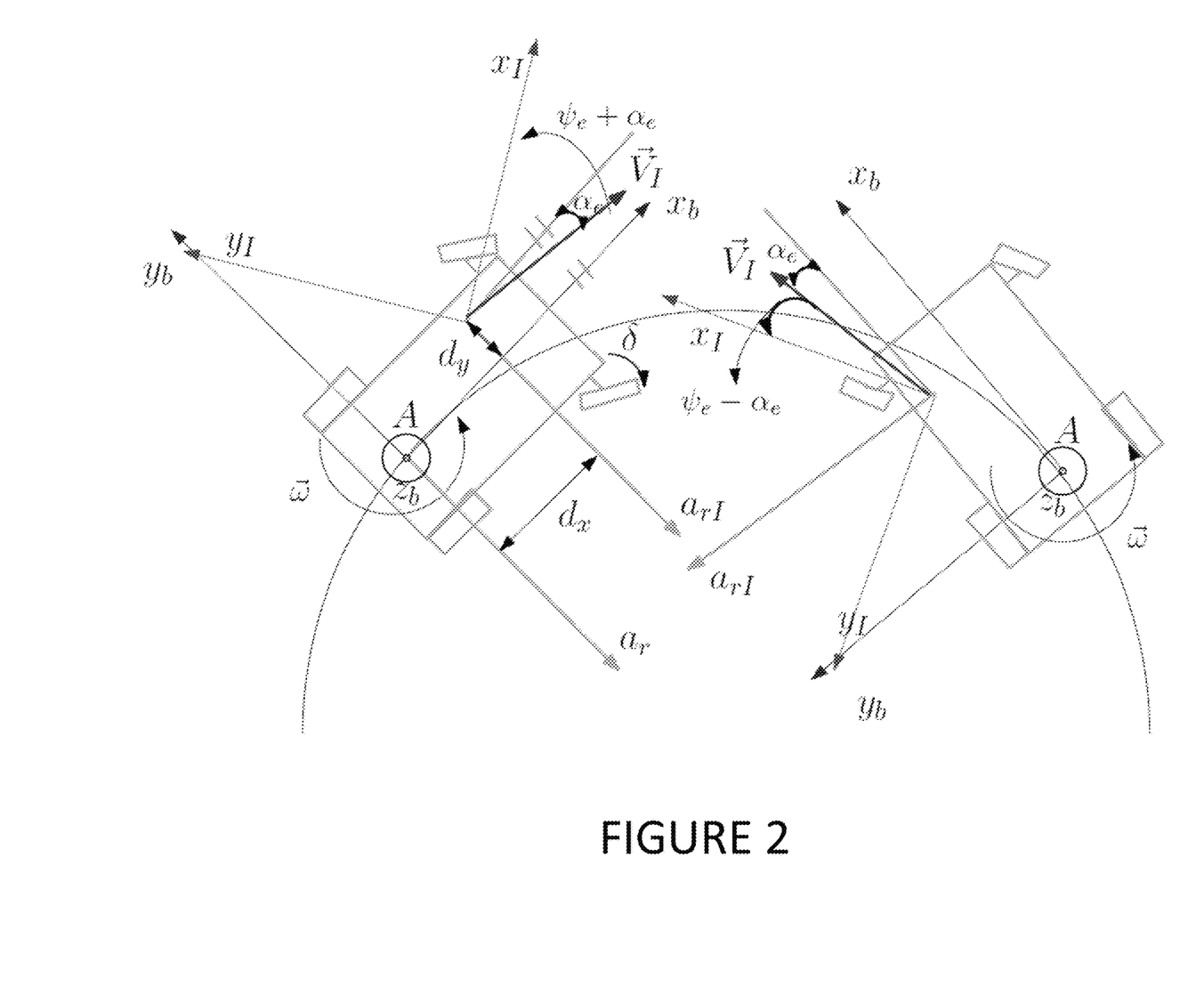
FIG. 2 is similar to FIG. 1 but it displays the case when an IMU unit is placed on the vehicle somewhere other than the pivot point of the vehicle; e.g. the center of the rear axle for front wheel steered vehicles.

When IMU is not located, as shown in FIG. 2, at point A, an error, $\alpha_e$ in yaw error detection occurs. When dy is negligible compared to turn radius, $\alpha_e$ for left and right turns are the same, $\alpha_e = \tan^{-1}((r \times dx)/V_A)$. Where, r stands for the yaw rate, the component of the $\vec{\omega}$ along $z_b$. While $\alpha_e$ decreases yaw error detection for left turn, it increases for right turn. Thus, when the same speed and same steering angle turn is performed for left and right pivots, this error will be canceled out. So, one can find yaw error directly from left turn and right turn separately and then take the average as it cancels out $\alpha_e$. Eq. 1.7 gives the same result. Since, in this case, it can be found that Eqs. 1.5 and 1.6 become $$\bar{a}_{lx} = \frac{a_{lx}^{left} - a_{lx}^{right}}{2} = a_r \sin\psi_e \cos\alpha_e \quad (1.12)$$

$$\bar{a}_{ly} = \frac{a_{ly}^{left} - a_{ly}^{right}}{2} = a_r \cos\psi_e \cos\alpha_e \quad (1.13)$$

which are not different than Eqs. 1.5 and 1.6. It can be added that it is possible to consider using the following form to find yaw orientation error as well:

$$\psi_e = \frac{\psi_e^r + \psi_e^l}{2} \quad (1.14)$$

where, $\psi_e^l$ and $\psi_e^r$ correspond to yaw error from left turn and right turn pivots, respectively.

2 Implementation

An illustrative implementation scenario, performed by a tester or technician, to do yaw misalignment is listed step by step as follows. Selected speed and steering angle (or the corresponding curvature) are depicted by V and δ. Besides, it is assumed that roll and pitch misalignment are already performed.
  a) Place the cone on the line intersecting the rear axle of the vehicle, on the left side of the vehicle.
  b) Turn the steering wheel to −δ (assuming +δ corresponds to left turn).
  c) Increase the speed to the selected value, V and start collecting IMU data as soon as passing through the cone by rear axle.
  d) Stop collecting data in the next pass of the cone and save data for right circle.
  e) Take the vehicle back to the position in the first step with opposite direction.
  f) Turn the steering wheel to δ.
  g) Increase the speed to the selected value, V and start collecting IMU data as soon as passing through the cone by rear axle.
  h) Stop collecting data in the next pass of the cone and save data for right circle.
  i) Perform coordinate frame transformation via roll and pitch misalignment angles, which is actually assumed to be done prior to this method. (If not performed, an approximate one can be done at the first step by collecting IMU acceleration data in stopped condition and plugging data into $$\theta_e = -\tan^{-1}\left(\frac{a_x}{\sqrt{a_y^2 + a_z^2}}\right)$$

and $$\phi_e = \tan^{-1}\left(\frac{a_x}{a_z}\right)$$

where $\alpha_x$, $\alpha_y$, and $\alpha_z$ stand for mean accelerations from IMU data before roll and pitch misalignment. $\emptyset_e$ and $\theta_e$ define roll and pitch misalignments. Select and find mean values of the data, $\bar{\alpha}_{Ix}$ and $\bar{\alpha}_{Iy}$, for left and right circles and plug them in to Eq. 1.7 to find yaw misalignment.

If desired, the step by step procedure above can be automated as well by detecting the complete pivots through calculations with the knowledge of steering wheel and speed or through GPS measurement.

C. Proof of Concept

FIGS. 3-8 show examples of the methodology described above. They show good agreement between under the test conditions indicated in the slides.

Two presentations are included:

In the first one, an IMU unit is placed above the rear axle center inside the cabin of the tractor, which is a front wheel steered vehicle. The IMU unit has an orientation with respect to the vehicle frame (Body-fixed frame), defined by Euler angles of yaw, pitch, and roll, which are approximately 33, 32, and 40 degrees, respectively. FIGS. 3-6 show the implementation of the method in calculation of orientations angles.

In the second presentation (FIGS. 7 and 8), the method is used to find the IMU orientation angles for the IMU unit, included in a board design/closure. An articulated vehicle and a front wheel steered vehicle are the used platforms in this presentation. For brevity, only the yaw orientation error detection results are included.

IMU Yaw Orientation Error Detection—on a Front Wheel-Steered Vehicle

Figure 3:
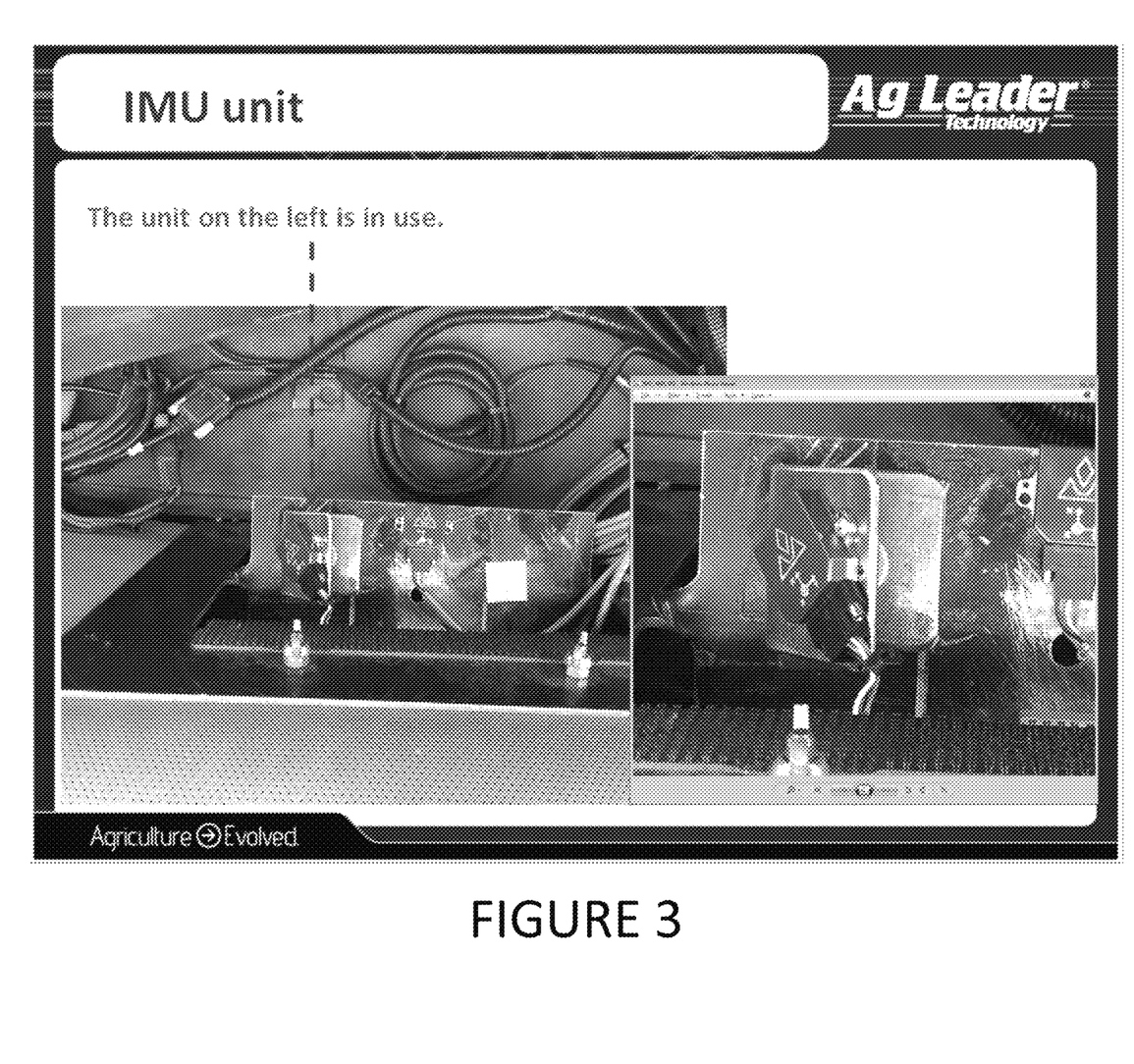
FIGS. 3-6 are diagrams and graphs illustrating an example of application of aspects of the invention to a front wheel steered vehicle.

FIG. 3 shows the IMU unit placed (on the left) inside the cabin almost above the rear axle. The IMU unit has an orientation (error) with respect to the vehicle frame (body-fixed frame), defined by Euler angles of yaw, pitch, and roll, which are approximately 33, 32, and 40 degrees, accordingly. This application corresponds to the case given in FIG. 1.

Figure 4:
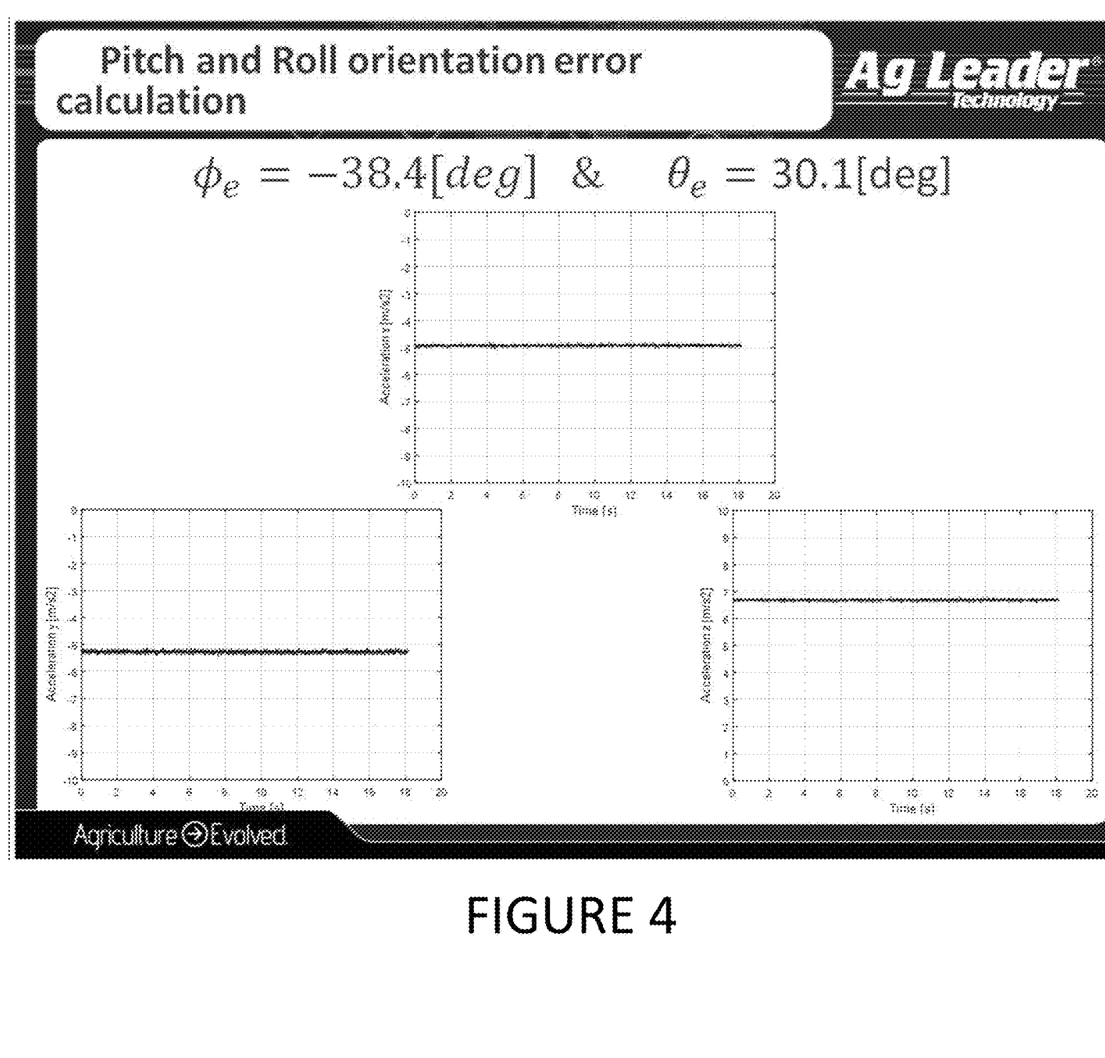

FIG. 4 shows collected data at standing still on an approximately flat terrain for a quick and approximate pitch and roll misalignment. The calculated pitch and roll orientation errors are also provided. This is a one-step roll and pitch misalignment, performed for evaluating yaw orientation error detection method; therefor, a few degree errors in roll and pitch orientation are very reasonable.

Figure 5:
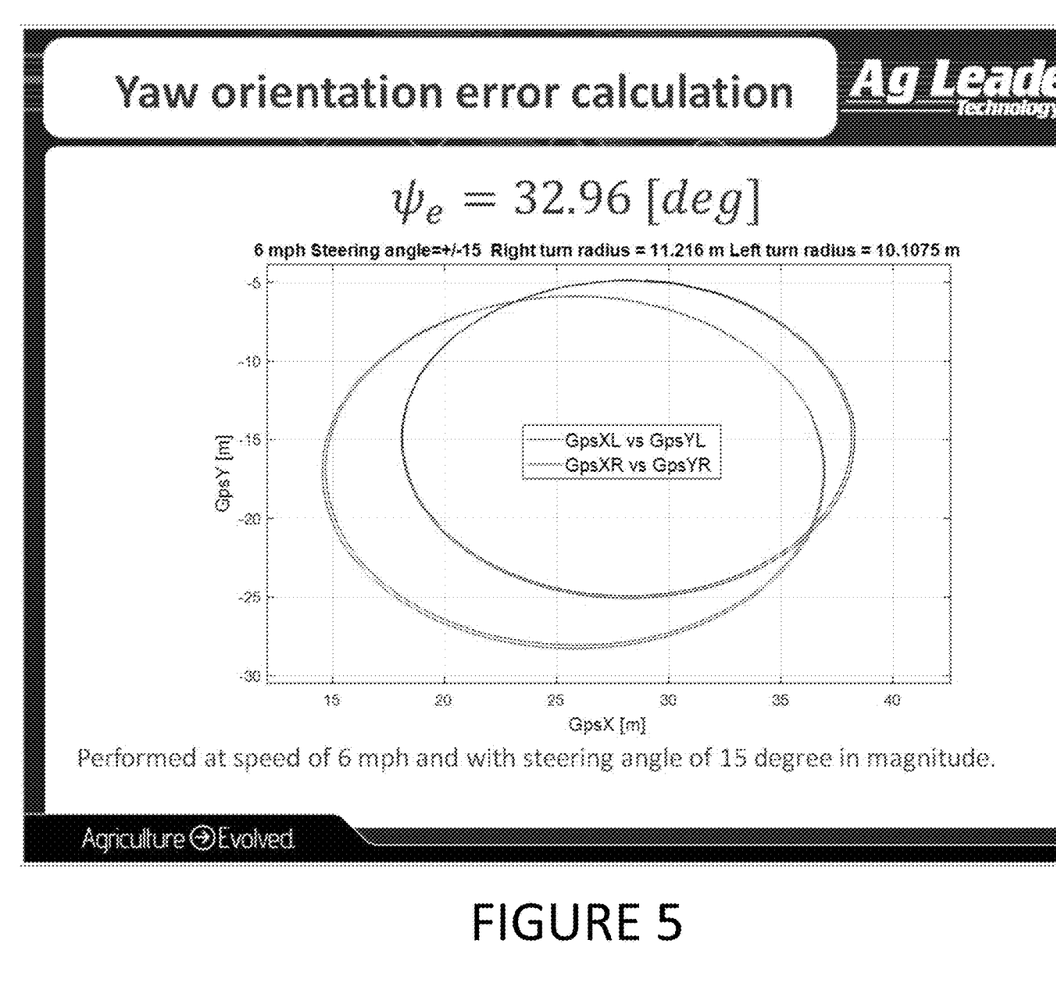

FIG. 5 shows the left and right pivot turns, plotted by the GPS data. Moreover, the yaw orientation error is also provided.

Figure 6:
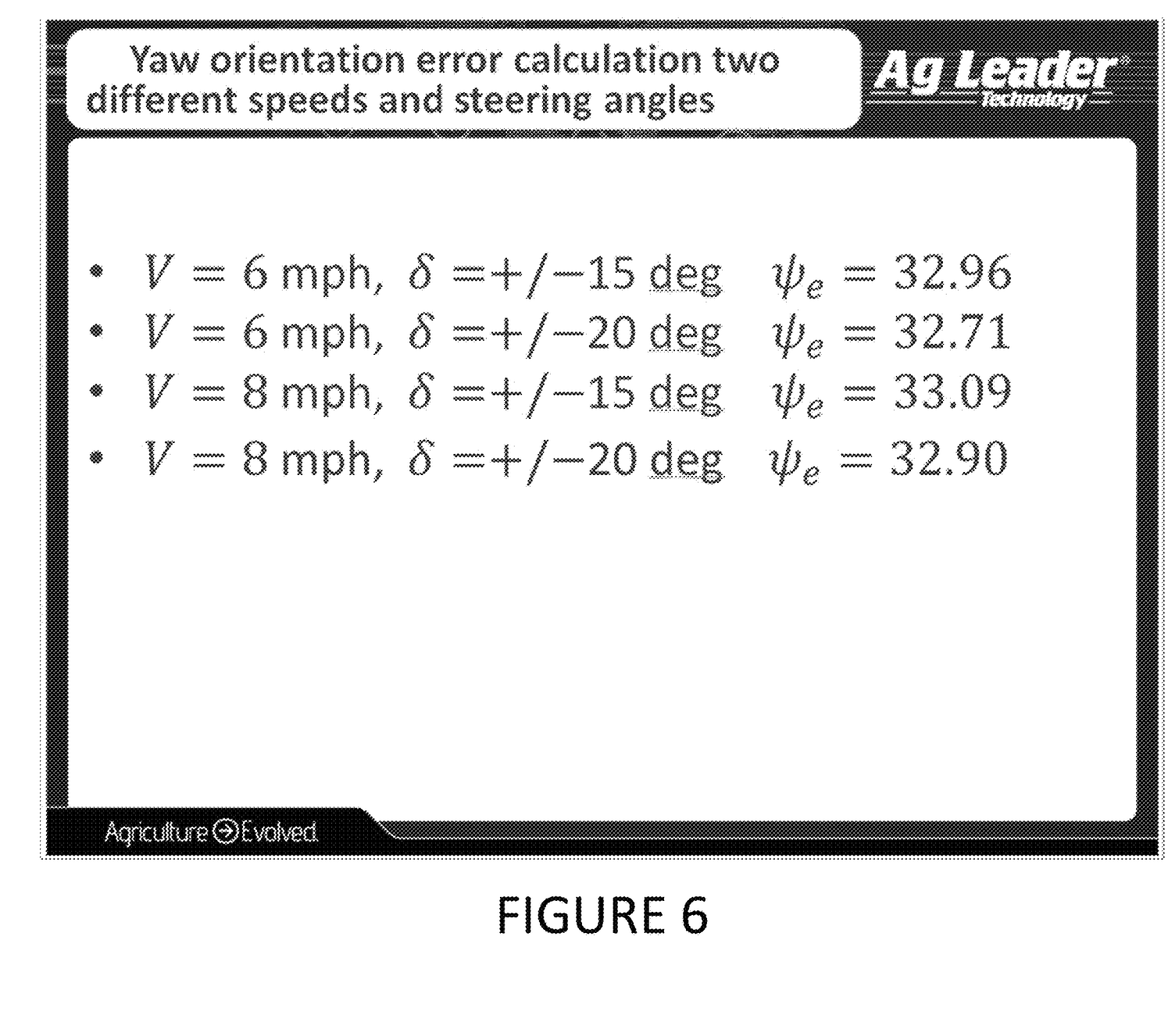

FIG. 6 shows the results for two different speeds and for two steering angles.

The results show the successful application of the method. The results are in very close range so the that the method can be applied at relatively slow speed and maximum steering angle. Thus, minimum space, safe, low speed are provided. Moreover, steering angle does not need to be measured.

IMU Yaw Orientation Error Detection—on an Articulated Vehicle; and on a Front Wheel-Steered Vehicle, Low Speed, Max Steering Angle In both vehicles, the IMU units are placed in a closed board unit (closure). Besides, the units are not located on the rear axle. This application corresponds to the case given in FIG. 2.

Figure 7:
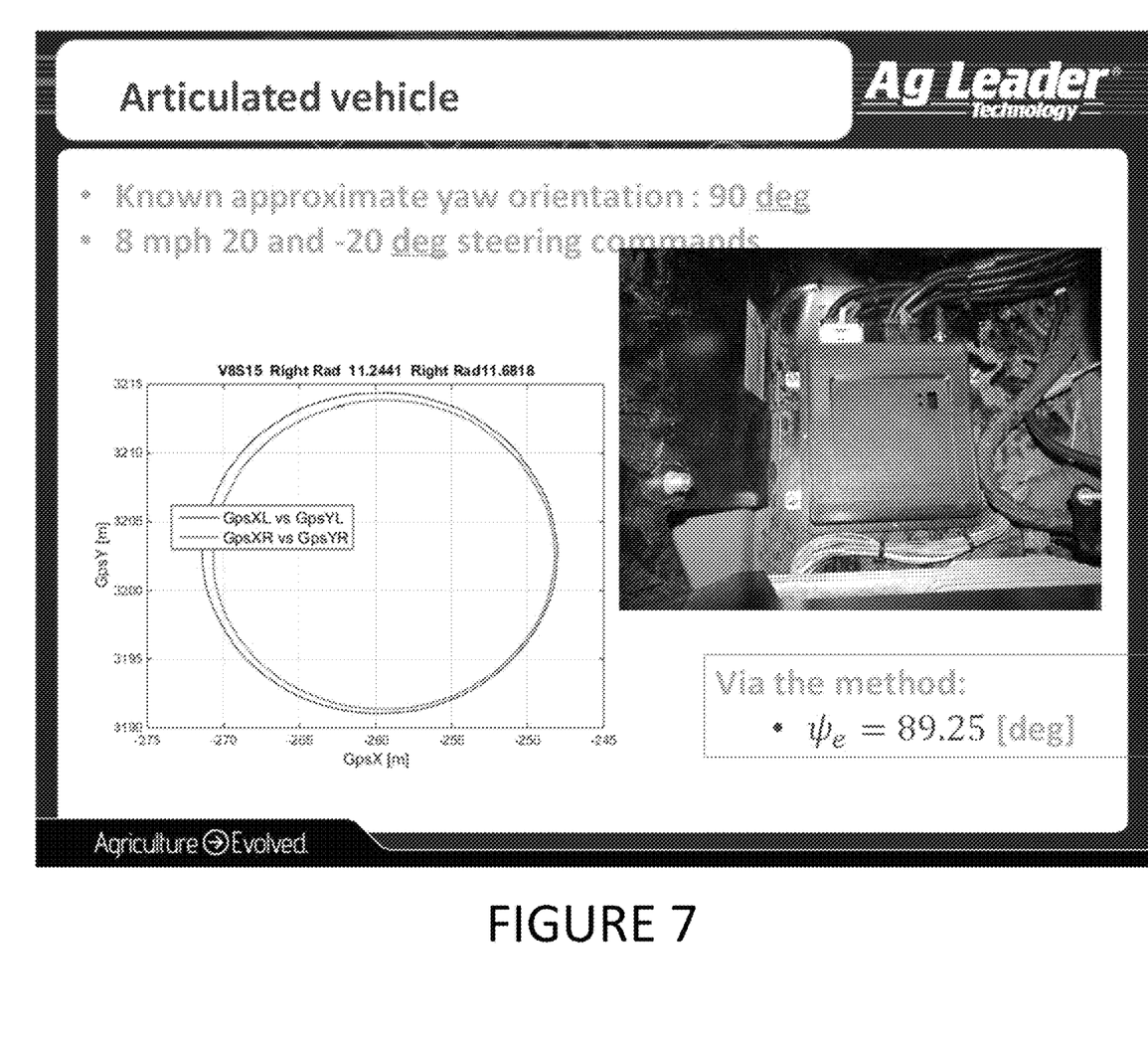
FIGS. 7 and 8 are diagrams and graphs illustrating an example of application of aspects of the invention to an articulated vehicle and another front-wheel steered vehicle at low speed at maximum steering angle (not to be limited to predetermined steering angle), respectively.

FIG. 7 shows the board located, including IMU unit, in the articulated vehicle, under the body seat. FIG. 7 also shows the calculated yaw orientation apart from the approximately measured orientation, in this case the IMU unit is quite away from the pivot point of the vehicle, where Body-fixed frame is located. The pivot point is at the front axle. The method successfully finds the yaw orientation error.

Figure 8:
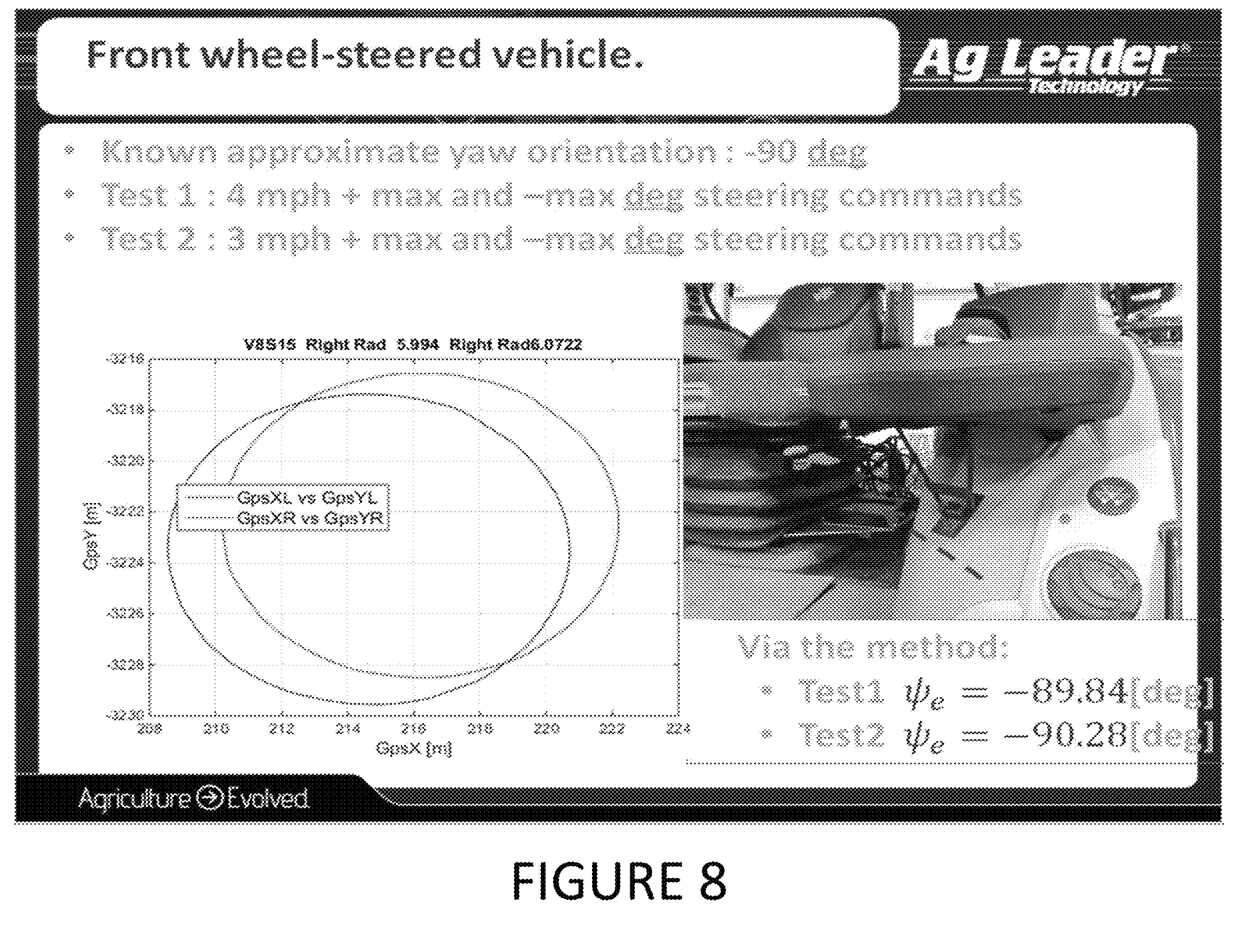

FIG. 8 shows the board located, including IMU unit, in the front-wheel-steered vehicle, next to the driver seat. In this case, low speeed and maximum steering angle are used to show that the method is applicable at this condition, which can easily be part of the calibration part. Thus, not a specific mid range steering angle is needed. Safer with low speed and less amount of area coverage by maximum steering angle use. Two separate tests were performed to prove the consistency of the solution.

D. Options and Alternatives

It will be appreciated that the invention can take various forms and embodiments. Variations obvious to those skilled in this technical field will be included within the invention, which is not limited by the specific embodiments and example discussed above.

For example, several specific proof of concept illustrations are shown above. The invention can be applied in analogous ways to other configurations.

Furthermore, the examples are intended to show application of the invention. A designer can utilize these teachings to apply the invention to particular situations. For example:
 a. Detecting unknown IMU orientations (not only misalignment or small errors)
 b. Obtaining optimum or reasonable speed and turn radius (steering angle).

Thus, methods, apparatus, and systems for detecting and compensating for yaw orientation error or misalignment of an IMU in a vehicle navigation system have been shown and described.

What is claimed is:

1. A method of detecting yaw orientation error $\psi_e$ for a vehicle with a body-fixed frame xyz coordinate system carrying an IMU (inertial measurement unit) with an IMU frame xyz coordinate system comprising:
 a. mounting the IMU to the vehicle, the IMU including sensors to measure IMU x-axis acceleration $\alpha_{Ix}$ and IMU y-axis acceleration $\alpha_{Iy}$ relative the IMU frame;
 b. measuring the IMU frame accelerations $\alpha_{Ix}$ and $\alpha_{Iy}$ during at least one of a left or right constant velocity turn of the vehicle;
 c. deriving yaw orientation error $\psi_e$ by solving tan $\psi_e = \alpha_{Ix}/\alpha_{Iy}$ for $\psi_e$;
 d. informing the IMU of any detected yaw orientation error;
 e. determining by the IMU a yaw orientation error compensated navigation solution using the yaw orientation error;
 f. communicating the yaw orientation error compensated navigation solution to a guidance system of the vehicle;
 g. using the yaw orientation error compensated navigation solution by the guidance system in performing automated steering of the vehicle.

2. The method of claim 1 wherein either a left or right constant velocity turn of the vehicle is used to derive $\psi_e$:
 a. when bias in acceleration measurement of the IMU is either known or below a predetermined threshold; and
 b. the IMU frame and the fixed-body frame share the same origin.

3. The method of claim 1 wherein both left and right constant velocity turns of the vehicle are used:
 a. when bias in acceleration measurements of the IMU is either unknown or above a predetermined threshold; and
 b. the IMU frame and the fixed body frame share an origin; and
 c. wherein the mean or average $\overline{\alpha}_{Ix}$ & $\overline{\alpha}_{Iy}$ are calculated for $\alpha_{Ix}$ and $\alpha_{Iy}$, and yaw orientation error $\psi_e$ is derived by solving tan $\psi_e = \overline{\alpha}_{Ix}/\overline{\alpha}_{Iy}$ for $\psi_e$.

4. The method of claim 1 wherein both left and right constant velocity turns of the vehicle are used to derive $\psi_e$:
 a. when bias in acceleration measurements of the IMU is either unknown or above a predetermined threshold, and
 b. the IMU frame and the fixed-body frame do not share the same origin by an offset $d_y$, which introduces yaw orientation error $\alpha_e$ in addition to $\psi_e$, wherein
 c. $\alpha_e$ is ignored as considered negligible when compared to turn radius of the vehicle during the turns; and
 d. the mean or average $\overline{\alpha}_{Ix}$ & $\overline{\alpha}_{Iy}$ are calculated for $\alpha_{Ix}$ and $\alpha_{Iy}$, and yaw orientation error $\psi_e$ is derived by solving tan $\psi_e = \overline{\alpha}_{Ix}/\overline{\alpha}_{Iy}$ for $\psi_e$.

5. The method of claim 1 wherein both left and right constant velocity turns of the vehicle are used:
 a. when bias in acceleration measurements of the IMU is either unknown or above a predetermined threshold, and
 b. the IMU frame and the fixed-body frame do not share the same origin by an offset $d_y$, which introduces yaw orientation error $\alpha_e$ in addition to $\psi_e$; wherein
 c. $\alpha_e$ is minimized by separately deriving:
  i. left turn yaw orientation error $\psi^l_e$;
  ii. right turn yaw orientation error $\psi^r_e$; and
  iii. yaw orientation error $\psi_e$ is derived by solving $\psi_e = (\psi^l_e + \psi^r_e)/2$.

6. The method of claim 1 wherein the IMU is a part of a GPS assisted inertial navigation system.

7. The method of claim 1 wherein steps a-d are performed in a calibration procedure associated with calibrating a guidance system for the vehicle.

8. An apparatus for producing a navigation solution from a navigation system including an IMU mounted on a vehicle comprising:
 a. a navigation system associated with the vehicle,
 b. the navigation system including at least
  i. an IMU including sensors to measure IMU frame accelerations;
  ii. a programmable digital processor to produce a navigation solution;
  iii. an output for communicating the navigational solution to a guidance system;
  iv. the digital processor being programmed to detect and compensate for yaw orientation error between a vehicle body-fixed frame xyz coordinate system and an IMU frame xyz coordinate system, whether or not sharing the same origin, by:
   1. measuring IMU x-axis acceleration $\alpha_{Ix}$ and IMU y-axis acceleration $\alpha_{Iy}$ relative the IMU frame during at least one of a left or right constant velocity turn of the vehicle;
   2. deriving yaw orientation error $\psi_e$ by solving tan $\psi_e = \alpha_{Ix}/\alpha_{Iy}$ for $\psi_e$; and
   3. compensating the navigation solution output by the detected yaw orientation error;
 a guidance system input connected to receive the compensated navigation solution output from the navigation system;

a control system connected to receive instructions from the guidance system regarding actuation of automated steering of the vehicle.

9. The apparatus of claim 8 wherein the navigation system is a GPS aided inertial guidance system.

10. The apparatus of claim 9 wherein the navigation solution is informed by the IMU and a GPS, and the IMU includes acceleration biases.

11. The apparatus of claim 8 wherein the guidance system comprises a vehicle steering guidance system.

12. The apparatus of claim 11 wherein the control system comprises one or more actuators connected to the steering of the vehicle.

13. The apparatus of claim 12 wherein the vehicle is an agriculture vehicle.

14. The apparatus of claim 13 wherein the vehicle is a fixed rear axial, steerable front wheels agriculture vehicle.

15. The apparatus of claim 8 wherein the IMU frame and the fixed-body frame share the same origin.

16. The apparatus of claim 8 wherein the IMU frame and the fixed-body frame do not share the same origin.

17. A system for automated steering of a vehicle comprising:
   a. a vehicle with a body-fixed frame xyz coordinate system;
   b. a navigation system including at least:
     i. an IMU with an IMU frame xyz coordinate system mounted on the vehicle and sharing the same origin as the body-fixed frame, the IMU including sensors to measure IMU frame acceleration; and
     ii. a programmable digital processor to produce a navigation solution;
     iii. the navigational solution comprising compensation for yaw orientation error by:
       1. measuring IMU frame acceleration for the IMU for at least one of left and right turns;
       2. detecting any yaw orientation error from the IMU frame measurements;
   c. a guidance system in communication with the navigation solution with yaw orientation error compensation;
   d. a control system in communication with the guidance system to control automated steering of the vehicle according to the yaw orientation error compensated navigation solution.

18. The system of claim 17 wherein the IMU frame and fixed-body frame share the same origin.

19. The system of claim 17 wherein the IMU frame and fixed-body frame do not share the same origin.

20. The system of claim 17 wherein the vehicle is a land vehicle.

21. The system of claim 20 wherein the land vehicle is a tractor.

* * * * *